United States Patent [19]

Loebner

[11] Patent Number: 5,159,322
[45] Date of Patent: Oct. 27, 1992

[54] APPARATUS TO DIGITIZE GRAPHIC AND SCENIC INFORMATION AND TO DETERMINE THE POSITION OF A STYLUS FOR INPUT INTO A COMPUTER OR THE LIKE

[76] Inventor: Hugh G. Loebner, 220 W. 98th St., Apt. 2B, New York, N.Y. 10025

[21] Appl. No.: 739,413

[22] Filed: Aug. 2, 1991

Related U.S. Application Data

[63] Continuation-in-part of Ser. No. 563,096, Aug. 3, 1990, Pat. No. 5,073,770, which is a continuation-in-part of Ser. No. 46,722, May 7, 1987, Pat. No. 4,949,079, which is a continuation-in-part of Ser. No. 725,126, Apr. 19, 1985, abandoned.

[51] Int. Cl.$^5$ .............................................. G09G 5/00
[52] U.S. Cl. ............................ 340/706; 340/707; 382/58
[58] Field of Search ........... 340/706, 709, 707, 815.31; 358/482, 483, 484; 382/58, 68; 250/227.2, 227.28; 385/121

[56] References Cited

U.S. PATENT DOCUMENTS

| | | |
|---|---|---|
| 3,337,860 | 8/1967 | O'Hara, Jr. |
| 3,539,995 | 11/1970 | Brandt |
| 3,613,066 | 10/1971 | Cooreman |
| 3,618,029 | 11/1971 | Graven |
| 3,673,579 | 6/1972 | Graven |
| 3,786,181 | 1/1974 | Pear, Jr. .............................. 358/484 |
| 4,078,151 | 3/1978 | McNeary |
| 4,205,304 | 5/1980 | Moore |
| 4,292,621 | 9/1981 | Fuller |
| 4,430,526 | 2/1984 | Brown et al. ....................... 340/707 |
| 4,464,652 | 8/1984 | Lapson et al. |
| 4,517,559 | 5/1985 | Deitch et al. |
| 4,550,250 | 10/1985 | Mueller et al. |
| 4,553,842 | 11/1985 | Griffin |
| 4,688,933 | 8/1987 | Lapeyre |
| 4,704,698 | 11/1987 | Reiniger |
| 4,707,109 | 11/1987 | Kanno et al. |
| 4,743,974 | 5/1988 | Lockwood |
| 4,788,587 | 11/1988 | Bitoh |
| 4,816,921 | 3/1989 | Akiyama et al. |
| 4,949,079 | 8/1990 | Loebner |
| 5,073,770 | 12/1991 | Loebner ............................ 340/706 |

FOREIGN PATENT DOCUMENTS

| | | | |
|---|---|---|---|
| 0121840 | 10/1984 | European Pat. Off. ............ 340/712 |
| 0057856 | 4/1983 | Japan ................................. 358/483 |
| 0039232 | 3/1985 | Japan ................................. 340/712 |
| 0138628 | 7/1985 | Japan ................................. 340/707 |
| 2124054 | 2/1984 | United Kingdom ................ 358/484 |

OTHER PUBLICATIONS

"Input for Computer Graphics Display", by A. Spiridon, Western Electric Technical Digest, No. 22, Apr. 1971, p. 39.

"Image Transducer for a Typewriter", by J. C. Edwards, IBM Technical Disclosure Bulletin, vol. 23, No. 7B, Dec. 1980.

*Primary Examiner*—Jeffery A. Brier

[57] ABSTRACT

A device for inputting graphic information contained on planar material, scenic information contained in a three dimensional scene, and position information of a stylus into a computer or the like by the cooperative use of the same nonlinear photodetector for digitizing the graphic information, the scenic information, and for determining the position of a stylus.

25 Claims, 4 Drawing Sheets

APPARATUS TO DIGITIZE GRAPHIC AND SCENIC INFORMATION AND TO DETERMINE THE POSITION OF A STYLUS FOR INPUT INTO A COMPUTER OR THE LIKE

This application is a continuation in part of application Ser. No. 07/563,096 filed Aug. 3, 1990, now U.S. Pat. No. 5,073,770 issued Dec. 17, 1991, which is a continuation in part of application Ser. No. 07/046,722 filed May 7, 1987, now U.S. Pat. 4,949,079 patented on Aug. 14, 1990, which is a continuation in part of application Ser. No. 06/725,126, filed on Apr. 19, 1985, now abandoned.

BACKGROUND OF THE INVENTION

U.S. Pat. Nos. 5,073,077 and 4,949,079 teach that a digitizer of graphic planar material such as paper may be combined with a touchscreen/stylus sensitive screen by the cooperative use of the the same photodigitizers. This application teaches that the material for digitization need not be restricted to planar material such as paper but can include scenic views, etc.

The difference between the invention taught here and those described in U.S. Pat. Nos. 4,949,079 and 5,073,077 is that this invention employs nonlinear photodetectors, instead of the linear ones employed in those patents. The use of nonlinear photodetectors permits this apparatus to capture three dimensional scenic information. The term nonlinear photodetector used hereafter must be understood to describe the physical shape of the photoreceptive area of the photodetector. It does not refer to the relationship of the output signal strength as a function of input electromagnetic signal.

The invention taught here is significantly different from the one taught by Brown et. al. in U.S. Pat. No. 4,430,526. The invention taught by Brown et.al. uses the tilt of a signal generating stylus to issue commands or instructions regarding modifications to a previously transmitted graphic. It would be inoperative when an inert or passive stylus such as a finger is the means to indicate the desired coordinate. This invention will work with any visible stylus. Also, in this invention, unlike that of Brow, et al, the tilt of the stylus is irrelevant. Finally, the invention of Brown et al, as described in their embodiment, uses the same optical system to image, onto the same photosensitive area of the photodetector, both the stylus (light emitting only) and the graphic material to be scanned. This results in a complex and unwieldy apparatus which requires an optical filter moved by a motor to filter all light except that of the stylus when it is desired to image the stylus.

The present invention also differs from that taught by Japanese Patent 60-138628. That patent teaches how to detect the position of a curser, that is, a projected light spot on a screen. That invention can not indicate the position of a stylus. It would be inoperative with a finger as a coordinate indicator.

SUMMARY OF THE PRESENT INVENTION

The present invention teaches an apparatus that can provide a computer or the like with a stylus position indicating system, and in addition, a scanner for digitizing graphic information on planar material and a camera for capturing three dimensional scenic information, all for input into a computer or the like. Another purpose of this invention is to teach that in such an apparatus linear information may be sectioned into multiple rows and imaged on the said nonlinear photodetectors to increase the resolution of the linear image.

The apparatus comprises (A) a first planar display surface such as an LCD screen having positions thereon identifiable by an X and Y coordinate system, (B) one or more nonlinear photodetectors such as a rectangular CCD array capable of producing a signal output suitable for input into a computer or the like (C) means for forming images of three dimensional scenic material on the said nonlinear photodetectors, (D) diffused light emitting sources opposite the light detector or detectors, (E) a switching mechanism and associated logic used to enable or disable the aforementioned light sources, (F) a stylus to be moved over the surface to different coordinate positions and (G) means to move relative to the nonlinear photodetectors a second planar surface such as paper or the like upon which there is graphic material which it is desired to digitize past the line of sight of the said nonlinear photodetectors for the purpose of digitizing graphic information on the said paper when the device is operating in a scanner mode, and (H) means for forming position indicating images of the said stylus on said nonlinear photodetectors.

BRIEF DESCRIPTION OF THE DRAWINGS

Other features and advantages of the graphic apparatus according to the invention will become apparent from the following specifications, claims and appended drawings in which:

DESCRIPTION OF THE PREFERRED EMBODIMENTS OF THE INVENTION

The present invention as explained hereafter, uses one or more nonlinear photodetectors to determine the position of a stylus by forming one or more images of the stylus on the said nonlinear photodetectors. The apparatus also is capable of digitizing graphic information, found both on planar material such as paper and in three dimensional depth. The configuration of the nonlinear photodetectors is such that they are cooperatively used.

Figure 1:
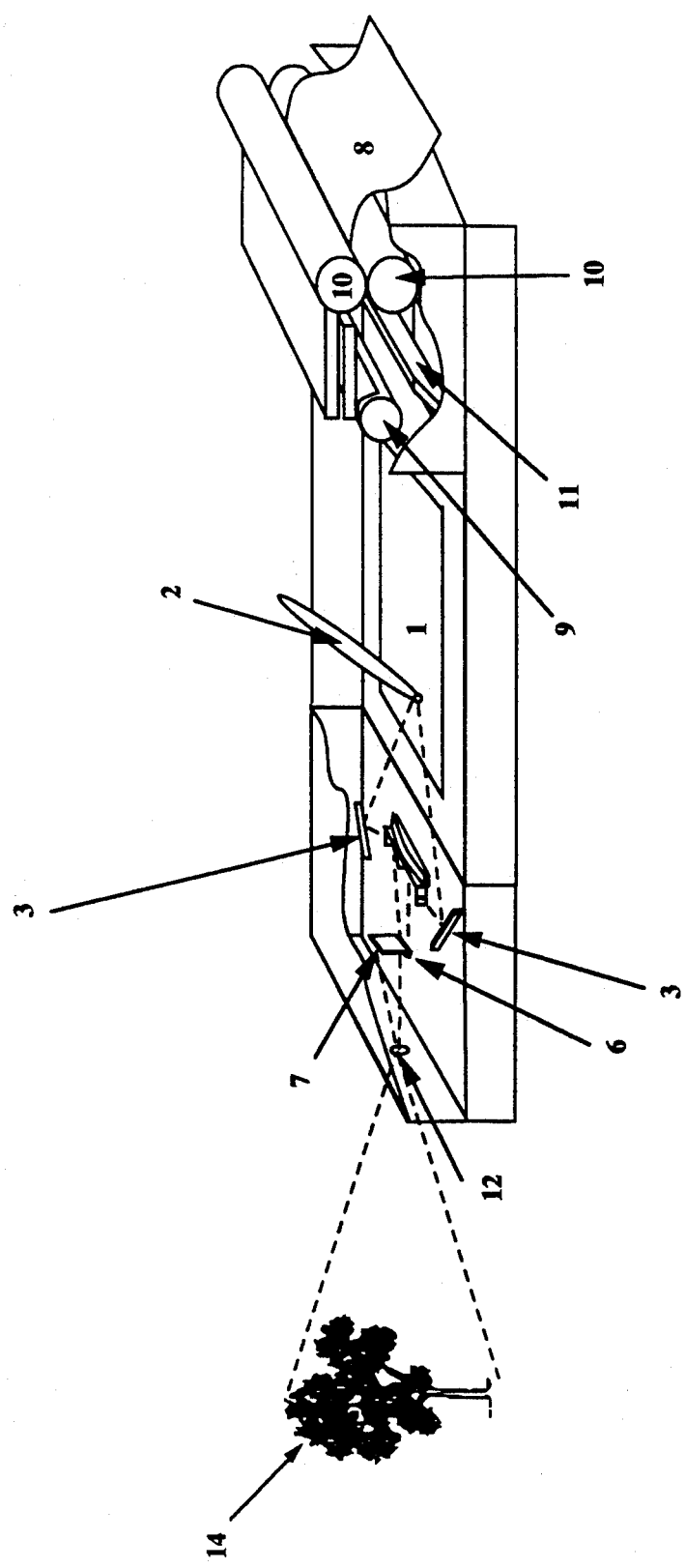
FIG. 1 is a perspective view of the apparatus embodying the invention.

FIG. 1 shows the preferred embodiment of the device. A lens 12 produces an image of a three dimensional object (here of a tree 14) on the nonlinear photodetector 7. Simultaneously, a rangefinder similar to the one described in U.S. Pat. No. 5,073,770 produces images of a stylus 2 on the said nonlinear photodetectors by means similar to that described in the said U.S. Pat. NO. 5,073,770. FIG. 1 also shows the scanner transport mechanism described in U.S. Pat. No. 5,073,770 comprising light 9, first scanner mirror 11, rollers 10, and sheet of paper 8.

Figure 2:
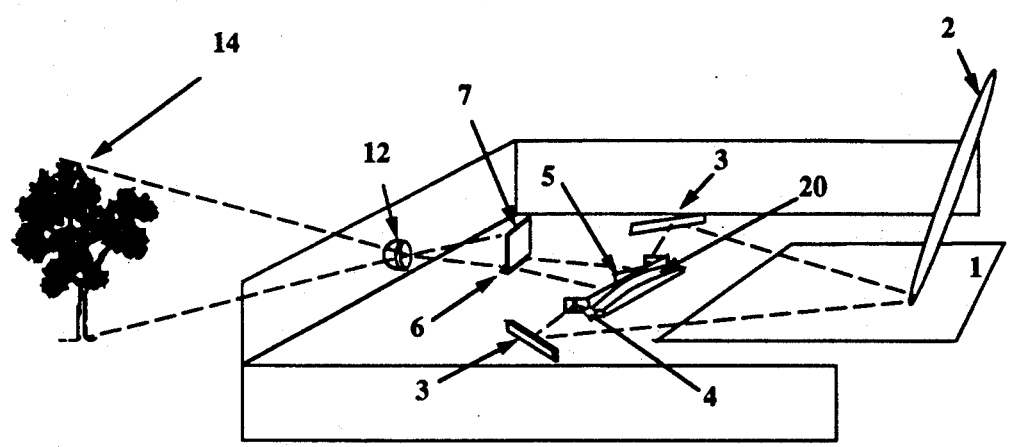
FIG. 2 is an enlarged fragmentary view of the graphic apparatus in FIG. 1 showing more clearly the optical paths of images of the stylus and the image to be digitized.

FIG. 2 shows more clearly the use of the use of apparatus as a stylus coordinates indicator and image digitizer. The stylus 2 is capable of moving over a planar surface 1 on which it is desired to indicate an X,Y position. First rangefinder mirrors 3 provide spatially distinct views of the said stylus. Slits 4 image these views. Rangefinder second mirrors 5 reflect the images back, under the nonlinear photodetectors 7 onto fixed mirror 6 that then reflects them onto one row of nonlinear photodetectors 7.

Figure 3:
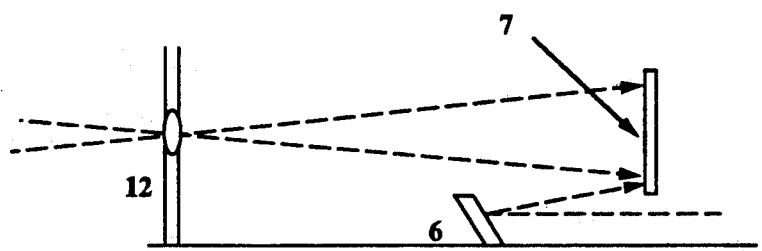
FIG. 3 is a fragmentary elevation of the optical paths showing how the photodigitizer can be cooperatively and simultaneously used.

It is a significant advantage of the invention as described in this embodiment that stylus position indicator and camera functions are both operative simultaneously, FIG. 3 shows how mirror 6 serves to reflect the images from the rangefinder assembly onto photodetector 7 while lens 12 forms an image on the same nonlinear photodetector above the image formed by the rangefinder assembly.

Figure 4:
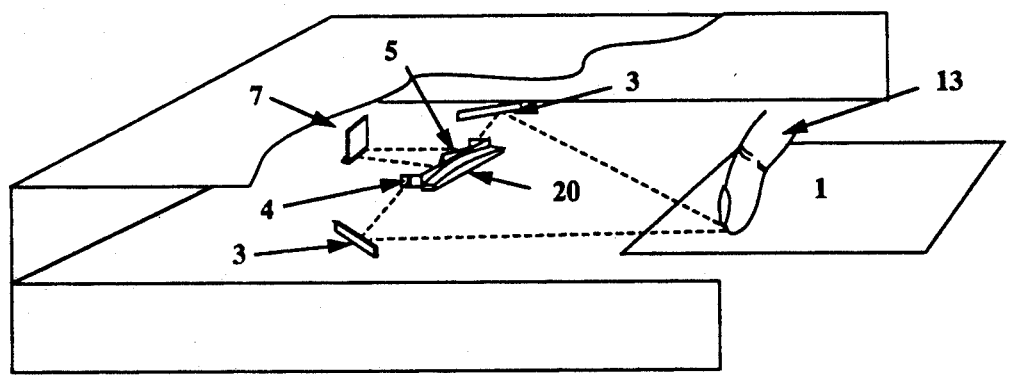
FIG. 4 is a fragmentary view showing the optics of the apparatus detecting the position of a finger.
Figure 5:
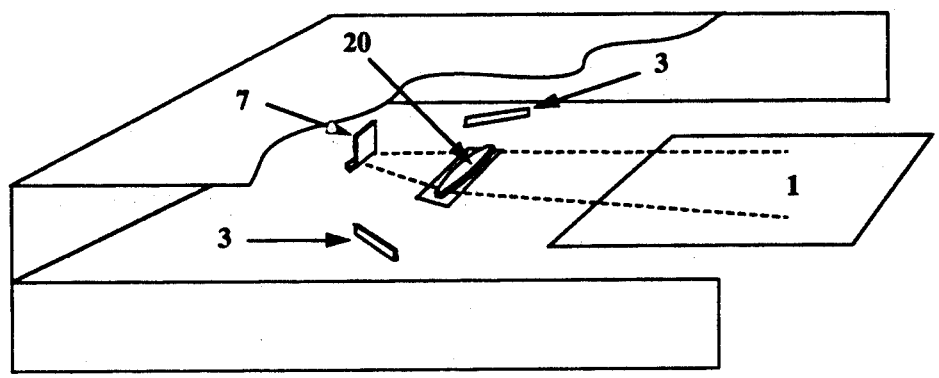
FIG. 5 is a fragmentary view showing that the rangefinder used to detect the position of a finger in FIG. 4 can be replaced by a lens suitable to image planar material.

FIG. 4 is a fragmentary view showing the manner of the apparatus detecting the position of a finger. For the apparatus to function properly, it is necessary to form images of the finger or other stylus on the photodetector 7. Presuming the existence of imaging systems such as slits 4, the stylus must be contrasted with a background. The stylus can be a light emitter against a dark background, it can be an opaque light absorber hiding a bright background, or it can be reflective with an albedo different from that of the background. FIG. 5 is a fragmentary view that shows the apparatus functioning in scanner/fax mode. The rangefinder assembly has been replaced with a lens 20. U.S. Pat. No. 5,073,770 more fully shows the operation of paper advance rollers 10 advancing paper 8 and front scanner front mirror reflecting a linear image of the said paper.

Those skilled in the art will understand that the resolution of a rectangular photodetector array in either dimension may be less than that desired for scanning linear images of graphic material on paper or the like or of a stylus. It may be desired to have a resolution of, e.g., 1536 pixels when digitizing from paper, but only, e.g., 512×515 pixels when digitizing other material. These alternative demands can be met by sectioning the linear image and projecting the sections on multiple rows or columns of the photodetector array. This has been taught by Pear, for instance, in U.S. Pat. No. 3,786,181 and the IBM Corporation technical Disclosure Bulletin Vol. 23 No. 7B Dec. 1980.

Figure 6:
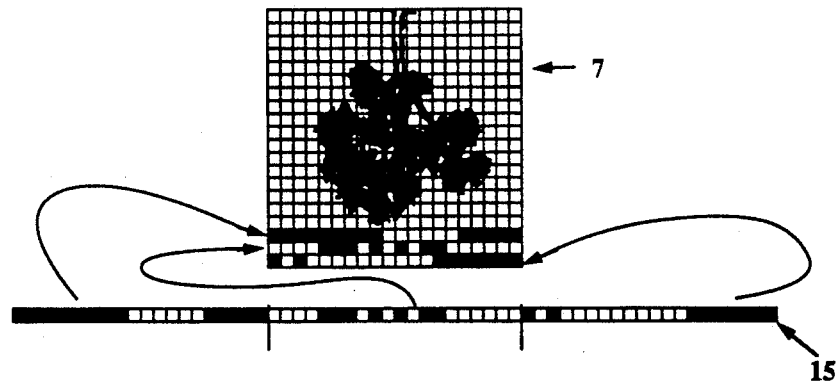
FIG. 6 schematic view of the photodigitizer array showing how multiple rows of the said photodigitizer array can be used to digitize a linear image at a greater resolution than has a single row or column of the array.

FIG. 6 shows photodetector 7 composed of multiple elements. The top of the photodetector array bears the image of tree 14. Linear image 15, shown below photodetector 7, is the image that it is desired to digitize. It can be seen that by trisecting the linear image and projecting the three sections onto the bottom three rows of array 7, the information can be captured at the desired resolution.

Figure 7:
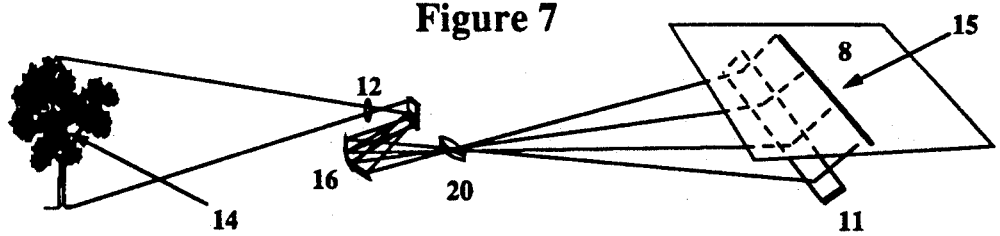
FIG. 7 is a fragmentary view showing a single row of graphic information on paper being trisected and imaged on the photodigitizer array.
Figure 8:
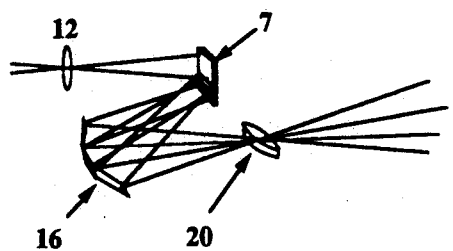
FIG. 8 is an enlarged view of a multiple mirror that can section and project the trisected linear image.

FIG. 7 shows one mode by which the linear image can be sectioned and projected. It is desired to scan paper 8. The line 15 represents the linear view of paper 8 that is currently being digitized. Linear image 15 is reflected off front scanner mirror 11 and an image formed by scanner lens 20. Multi-segmented mirror 16 reflects the image onto three rows of photodigitizer array 7. FIG. 8 is an enlarged view better showing the operation of multi-segmented mirror 16. Those skilled in the art will understand that there will be some distortion of the image produced by the manner of reflection. Specifically, part of the reflected images will appear stretched. Simple digital image processing by the computer can easily compensate for the distortion. Alternatively, compensator optical components may be added to correct the distortion.

Figure 9:
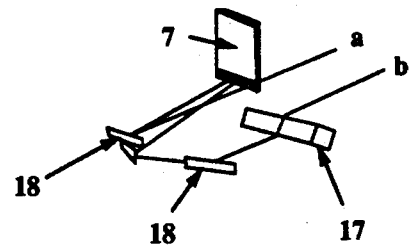
FIG. 9 is a partial view of an alternative optical system incorporating prisms and mirrors to section and project the linear image.
Figure 10:
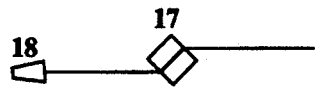
FIG. 10 is a side elevation showing how a rectangular prism may be used to provide the desired vertical offset in the optical path.
Figure 11:
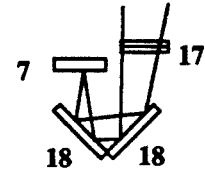
FIG. 11 is a fragmentary plan view showing how mirrors can provide a desired lateral offset for the optical path.

FIG. 9 shows an partial view of an alternative method of segmenting a linear image. Central beam of the image is represented by line segments 'a'. This segment is directly reflected back to photodetector array 7. Side beam 'b' passes first through prism 17 which produces a vertical offset, thence is reflected off mirrors 18 which produce lateral offset and reflect the beam onto photodetector array 7. FIG. 10 shows the manner of the vertical offset by the prism. FIG. 11 shows the lateral offset by means of mirrors 18. Those skilled in the art will understand that the optical path of the side beam is longer than the central beam. This will result in imaging at different plains. If the loss of resolution resulting from the different foci is objectionable, then the central beam's optical path may be lengthened by interposing mirrors.

Figure 12:
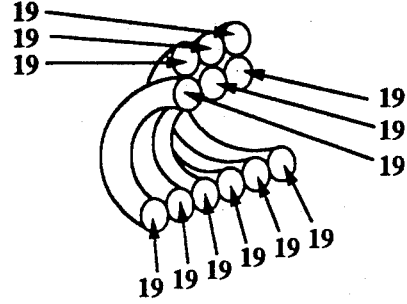
FIG. 12 is a fragmentary view showing how optical fibers may be arranged to provide sectioning, lateral and vertical offset.

FIG. 12 shows how optical fibers may be arranged to function to section and direct the image into multiple rows. The six optical fibers are disposed in a linear arrangement at the focus of the imaging system. Light can be conducted within each optical fiber to each desired photodetector element. In the configuration depicted in FIG. 12 the linear image of six elements would be bisected into two rows of three pixels each. Only six fibers are shown in FIG. 12 to simplify the idea. In actual operation the number of optical fibers would be greater.

It should be clear to one versed in the art that any nonlinear photodetector which provides means responsive to electromagnetic radiation spatial patterns to produce a signal suitable for input into a computer or the like can be used in this invention. This invention teaches that it is possible, productive, and useful to make multiple or cooperative use of such an electromagnetic radiation responsive signal generator.

I claim:

1. An apparatus for (A) digitizing three dimensional scenic information for input into a computer or the like, and for (B) indicating the coordinate position of a stylus for input into a computer or the like comprising means for the cooperative use of a nonlinear photodetector where the means for the cooperative use of said nonlinear photodetector comprises:
  means for imaging said three dimensional scenic material onto said nonlinear photodetector, and
  means for indicating the position of said stylus comprises means for forming at least one image of said stylus onto said nonlinear photodetector;
  wherein said means for the cooperative use of said nonlinear photodetector does not consist of the cooperative use of the same lens to image a light emitting stylus and to image three dimensional scenic information at the same magnification onto the same photosensitive area of said nonlinear photodetector.

2. An apparatus according to claim 1 where the means for imaging said three dimensional scenic information comprises a lens.

3. An apparatus according to claim 1 where the means for indicating the position of said stylus by means for forming at least one image of said stylus comprises a rangefinder.

4. An apparatus according to claim 3 where said rangefinder comprises means for forming at least two images of said stylus.

5. An apparatus according to claim 1 where said nonlinear photodetector comprises a CCD array.

6. An apparatus according to claim 1 wherein said at least one image of said stylus comprises a linear image of said stylus and means for imaging said at least one linear image comprises optical fibers.

7. An apparatus according to claim 6 wherein said optical fibers are used to partition said linear image of said stylus into more than one linear image section and said partitioned linear image sections are imaged by said optical fibers onto more than one row or column of said photodetector.

8. An apparatus for (A) digitizing graphic information contained on planar material for input into a computer or the like, and for (B) digitizing three dimensional scenic information for input into a computer or the like, and for (C) indicating the coordinate position of a stylus for input into a computer or the like comprising means for the cooperative use of a nonlinear photodetector where the means for the cooperative use of said nonlinear photodetector comprises:
  means for imaging said three dimensional scenic material onto said nonlinear photodetector, and
  means for imaging said graphic information contained on planar material onto said nonlinear photodetector, and
  means for indicating the position of said stylus comprises means for forming at least one image of said stylus onto said nonlinear photodetector;
  wherein said means for the cooperative use of said nonlinear photodetector does not consist of the cooperative use of the same lens to image a light emitting stylus and to image three dimensional scenic information and to image graphic information contained on planar material at the same magnification onto the same photosensitive area of the said nonlinear photodetector.

9. An apparatus according to claim 8 where said nonlinear photodetector comprises a CCD array.

10. An apparatus according to claim 8 where the means for imaging graphic information contained on planar material comprises means for forming successive linear images of said graphic information contained on said planar material by means for moving said planar material and said nonlinear photodetector relative to each other and means for imaging said linear images onto said nonlinear photodetector.

11. An apparatus according to claim 8 where the claimed means for imaging said three dimensional scenic information comprises a lens.

12. An apparatus according to claim 8 where the claimed means for indicating the position of said stylus by means for forming at least one image of said stylus comprises a rangefinder.

13. An apparatus according to claim 12 where said rangefinder comprises means for forming at least two images of said stylus.

14. An apparatus according to claim 8 wherein said at least one image of said stylus comprises a linear image of said stylus and means for imaging said at least one linear image comprises optical fibers.

15. An apparatus according to claim 14 wherein said optical fibers are used to partition said linear image of said stylus into more than one linear image section and said partitioned linear image sections are imaged by said optical fibers onto more than one row or column of said photodetector.

16. An apparatus for (A) digitizing three dimensional scenic information for input into a computer and the like and for (B) indicating the coordinate position of a stylus for input into a computer and the like comprising means for the cooperative use of a nonlinear photodetector where said means for the cooperative use of said nonlinear photodetector comprises:
  means for imaging said three dimensional scenic material onto said nonlinear photodetector, and
  means for indicating the position of said stylus comprises means for forming at least one image of said stylus on said nonlinear photodetector comprising a rangefinder.

17. An apparatus according to claim 16 where the means for imaging said three dimensional scenic information comprises a lens.

18. An apparatus according to claim 16 where said rangefinder comprises means for forming at least two images of said stylus.

19. An apparatus according to claim 16 where said nonlinear photodetector comprises a CCD array.

20. An apparatus for (A) digitizing graphic information contained on planar material for input into a computer or the like, and for (B) digitizing three dimensional scenic information for input into a computer or the like, and for (C) indicating the coordinate position of a stylus for input into a computer or the like comprising means for the cooperative use of a nonlinear photodetector where said means for said cooperative use of said nonlinear photodetector comprises:
  means for imaging said three dimensional scenic material onto said nonlinear photodetector, and
  means for forming successive linear images of said graphic information contained on said planar material and means for imaging said linear images onto said nonlinear photodetector, and
  means for indicating the position of said stylus comprising means for forming at least one image of said stylus onto said nonlinear photodetector.

21. An apparatus according to claim 20 where the claimed means for imaging said three dimensional scenic information comprises a lens.

22. An apparatus according to claim 20 where said means for indicating the position of said stylus comprising means for forming at least one image comprises a rangefinder.

23. An apparatus according to claim 20 where said means for forming successive linear images of said graphic information is by means for moving said planar material and said nonlinear photodetector relative to each other.

24. An apparatus according to claim 20 wherein said means for imaging said linear images onto said nonlinear photodetector comprises means for digitizing said linear images of said planar material at a greater linear resolution than has said nonlinear photodetector by means for dividing each said linear image into a multiple number of linear image sections and means for imaging said multiple linear sections onto said nonlinear photodetector.

25. An apparatus according to claim 24 in which means for dividing each said linear image into a multiple number of linear image sections and means for imaging said multiple linear sections onto said photodetector array comprises optical fibers.

* * * * *